United States Patent [19]

Ogawa

[11] Patent Number: 5,435,839
[45] Date of Patent: Jul. 25, 1995

[54] FINISHING AGENTS AND METHOD OF MANUFACTURING THE SAME

[75] Inventor: Kazufumi Ogawa, Nara, Japan

[73] Assignee: Matsushita Electric Industrial Co., Ltd., Osaka, Japan

[21] Appl. No.: 173,779

[22] Filed: Dec. 27, 1993

Related U.S. Application Data

[63] Continuation-in-part of Ser. No. 68,661, May 27, 1993.

[30] Foreign Application Priority Data

Dec. 24, 1992 [JP] Japan ................................. 4-344190
Mar. 19, 1993 [JP] Japan ................................. 5-59782

[51] Int. Cl.⁶ .............................................. B05D 5/08
[52] U.S. Cl. ........................................ 106/10; 427/387
[58] Field of Search ........................ 427/387; 106/3, 10

[56] References Cited

U.S. PATENT DOCUMENTS 3,856,533 12/1974 Schnurrbusch et al. ............. 106/10
4,269,739 5/1981 Grejsner ................................ 106/10
4,404,035 9/1983 Ona et al. ............................. 106/10
4,824,766 4/1989 Ogawa .................................. 430/299

FOREIGN PATENT DOCUMENTS 0282188 9/1988 European Pat. Off. .
59-157169 9/1984 Japan .
3100060 4/1991 Japan .

Primary Examiner—Shrive Beck
Assistant Examiner—Erma Cameron
Attorney, Agent, or Firm—Fish & Richardson

[57] ABSTRACT

An ultra-thin, water- and oil-repelling and durable overcoat easily formed on a substrate surface via covalent bonding by applying a finishing agent, in which a chemical adsorbent including at least one chlorosilyl group is mixed in a nonaqueous viscous liquid or a solid medium, to the substrate surface; and an oil-repelling, extremely thin and durable overcoat with a high water-separation property covalently bonded to a substrate surface by applying an organsiloxane-based finishing agent, in which at least one organosiloxane bond chain and chlorosilyl group are mixed in a nonaqueous viscous liquid or a solid medium, to the substrate surface.

4 Claims, 5 Drawing Sheets

FINISHING AGENTS AND METHOD OF MANUFACTURING THE SAME

This is continuation-in-part of application Ser. No. 08/068661, filed May 27, 1993.

FIELD OF THE INVENTION

The invention relates to a wax-type finishing agent and a method of manufacturing the same. More particularly, the invention relates to a method of manufacturing a finishing agent to form a durable ultra thin water- and oil-repelling chemically adsorbed overcoat on the surface of a substrate. The invention also relates to a method of manufacturing a wax-type organosiloxane-based finishing agent used for forming a chemically adsorbed overcoat with a high water-separation property.

BACKGROUND OF THE INVENTION

Finishing agents have been used in many fields, such as automobile wax, floor and interior products, glazing agents, fur polish, lubricants for a papered sliding door or sliding paper door, and mechanical parts or the like.

The above-noted conventional finishing agents are solid or emulsified, and generally comprise the mixture of a petroleum solvent, silicone, wax or lower alcohol, and an abrasive material.

Conventional finishing agents have weak water repelling and lustering properties, and conventional overcoats do not have sufficient endurance and hardness since they are merely applied to the substrate surfaces. In addition, they hardly possess an oil-repelling property. Since the agents are physically adhered to the substrate surfaces, they have endurance and solidity deficiencies.

SUMMARY OF THE INVENTION

An objective of the invention is to provide wax-type finishing agents with superior water-repelling, lustering and water-separation properties and a method of manufacturing the same, wherein an overcoat chemically bonded to a substrate surface has sufficient endurance and hardness, and wherein the overcoat with an oil-repelling property is formed on the substrate surface, thereby solving the above-noted problems.

In order to accomplish this and other objects and advantages, one embodiment of the finishing agent of the invention comprises a siloxane compound, a chemically adsorptive compound with at least one halosilyl group, and a nonaqueous viscous liquid or a solid medium.

It is preferable in this composition that the siloxane compound is at least one compound selected from the group consisting of $Si(OH)_4$, $SiH(OH)_3$, $SiH_2(OH)_2$, and $Si(OH)_3O[Si(OH)_2O]_nSi(OH)_3$ (wherein n is 0 or an integer).

It is also preferable in this composition that the chemically adsorptive compound comprising at least one halosilyl group is provided as seen below:

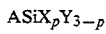

$ASiX_pY_{3-p}$ wherein A represents an organic group containing at least one group selected from the group consisting of an alkyl group, a vinyl group, an ethynyl group, an aryl group, a silicon containing organic group and an oxygen containing organic group; X is a member selected from the group consisting of H, an alkyl group, an alkoxyl group, a fluoroalkyl group and a fluoroalkoxyl group; Y represents at least one halogen group selected from the group consisting of Cl, Br, F and I; and p represents 0, 1 or 2.

It is preferable in this composition that the viscosity of the nonaqueous viscous liquid or solid medium is 1000 cps or above.

It is also preferable in this composition that the viscous liquid or solid medium has a boiling point at 100° C. or above and is mixed with the viscous liquid or solid medium having a boiling point from 25° C. to 100° C.

It is preferable in this composition that the finishing agent comprises inorganic particles having an average diameter less than 10 μm.

A method of manufacturing the finishing agent of the invention comprises the steps of:
- adding a silyl compound comprising at least two halogen groups into a mixture of a tertiary amine or amide with no active hydrogens and a nonaqueous viscous liquid or solid medium;
- reacting the silyl compound with water contained in the mixture, thus forming a siloxane compound; and
- adding and mixing a chemically adsorptive compound comprising at least one halosilyl group with the siloxane compound.

Active hydrogens are hydrogens which can promote a condensation reaction with a halosilyl group of a halosilane compound. More specifically, such hydrogens include —OH, —COOH, —CHO, —NH$_2$, >NH, and the like.

It is preferable in this method that the silyl compound comprising at least two halogen groups is at least one compound selected from the group consisting of $SiCl_4$, $SiHCl_3$, $SiH_2Cl_2$, and $SiCl_3O(SiCl_2O)_nSiCl_3$ (wherein n represents 0 or an integer).

Since the finishing agent of the invention contains the siloxane compound, chemically adsorptive compound comprising at least one halosilyl group, and nonaqueous viscous liquid or solid medium, the agent is a wax-type finishing agent with excellent water-repelling and lustering properties. An overcoat formed from the finishing agent of the invention is chemically bonded to a substrate surface with sufficient endurance and hardness, and has oil-repelling properties. When the finishing agent is rubbed and coated on a substrate surface like a car wax, an extremely thin and water- and oil-repellent overcoat with significant endurance is formed easily on the substrate surface. The coating procedures are also simple, and a large-scale reactor is not required in the invention.

If the siloxane compound is at least one compound selected from the group consisting of $Si(OH)_4$, $SiH(OH)_3$, $SiH_2(OH)_2$, and $Si(OH)_3O[Si(OH)_2O]_nSi(OH)_3$ (wherein n is 0 or an integer), the compound would provide a lustering property to an overcoat. The siloxane compound is also effective as an agent to control viscosity.

When the chemically adsorptive compound comprising at least one halosilyl group is $ASiX_pY_{3-p}$ (wherein A represents an organic group containing at least one group selected from the group consisting of an alkyl group, a vinyl group, an ethynyl group, an aryl group, a silicon containing organic group and an oxygen containing organic group; X is a member selected from the group consisting of H, an alkyl group, an alkoxyl group, a fluoroalkyl group and a fluoroalkoxyl group; Y represents at least one halogen group selected from the group consisting of Cl, Br, F and I; and p represents 0, 1 or 2), an overcoat can be chemically adsorbed to a substrate surface via Si groups. The most preferable chemically adsorptive compound is a compound comprising a chlorosilyl group.

Conveniently, the finishing agent is inhibited from running during its application to a substrate surface when the viscosity of the viscous liquid or solid medium is 1000 cps or above. If the viscous liquid or solid medium with its boiling point at 100° C. or above is mixed with one having its boiling point from room temperature to 100° C., an overcoat can firm up quickly right after the application of the agent by vaporizing the material with the lower boiling points. As a result, the removal of the finishing agent is made simple.

Moreover, if an abrasive material, having particles less than 10 μm in average diameter (such as alumina, silicon carbide, boron carbide, chromium oxide, iron oxide, synthetic diamond or fine-grain silica) is added to the finishing agent, a small amount of the substrate surface is removed without reducing the luster of the surface. As a result, the reaction between the chemically adsorptive compound containing at least one chlorosilyl group and the cleaned substrate surface is improved.

The method of manufacturing the finishing agent of the invention includes the steps of:

preparing a nonaqueous viscous liquid or solid medium:

adding and mixing a silyl compound comprising at least two halogens (for example, Cl groups);

promoting a dehydrohalogenation (such as a dehydrochlorination reaction) between water contained in the viscous liquid or solid medium and the silyl compound, thus generating a siloxane compound and dehydrating at the same time; and mixing a chemically adsorptive compound comprising at least one chlorosilyl group, thus keeping the chemically adsorptive compound in an active condition.

It is preferable to use $SiCl_4$, $SiHCl_3$, $SiH_2Cl_2$, or $SiCl_3O(SiCl_2O)_nSiCl_3$ (wherein n represents 0 or an integer) as the silyl compound comprising many Cl groups. The volume of the silyl compound added to the viscous liquid or solid medium is required to be enough to remove water in the nonaqueous viscous liquid or solid medium.

The nonaqueous viscous liquid or the solid medium normally contains a little water. Nonaqueous is defined as having a water content of 100 ppm or less. Therefore, when the chemically adsorptive compound comprising at least one chlorosilyl group is directly added to the viscous liquid or solid medium, the compound would be reacted to water and then deactivated. Thus, a tertiary amine or amide comprising no active hydrogens is mixed in the nonaqueous viscous liquid or solid medium, and then a dehydrochlorination reaction between water contained in the viscous liquid or medium and thiol- or amino-based impurities is generated by mixing a material containing many chlorosilyl groups into the liquid or medium mixed with the tertiary amine or amide, thus forming a siloxane compound. In other words, the water reacts with siloxane, to form hydrochloric acid and promote dehydration. Thiol- or amino-base impurities react with SiCl groups, thereby forming Si S bonds or Si—N bonds and bonding to a polysiloxane compound.

The hydrochloric acid is vaporized and removed. It is not necessary to remove the polysiloxane compound since it is stable to the chemically adsorptive compound comprising at least one chlorosilyl group. Rather, the polysiloxane compound should not be removed because the compound can provide a lustering property to an overcoat. Water contained in the viscous liquid or solid medium and thiol or amino-based impurities are removed due to the dehydrochlorination reaction with the material containing many chlorosilyl groups after adding a chemically adsorptive compound comprising at least one chlorosilyl group. Thus, a finishing agent, in which the chemically adsorptive compound comprising at least one chlorosilyl group is contained in an active condition, can be manufactured.

Based on a method of using a finishing agent of the invention, the agent, comprising a chemically adsorptive compound with at least one chlorosilyl group and a nonaqueous viscous liquid or solid medium, is applied to a substrate surface comprising hydrophilic groups. Then, the substrate surface is reacted with the compound comprising at least one chlorosilyl group. When active hydrogens are contained in the substrate surface, a dehydrochlorination reaction is generated between the chlorosilyl groups of the compound and the active hydrogens, thereby fixing molecules comprising at least one chlorosilyl group to the substrate surface by a covalent bonding via Si atoms. Unreacted finishing agent is then either wiped off or washed away with detergent or water. Although the compound is very reactive to moisture in the air, the nonaqueous viscous liquid or solid medium can protect the substrate surface from moisture in the air, thereby helping to promote the dehydrochlorination reaction on the substrate surface.

Due to this method, an ultra-thin overcoat of molecules comprising at least one chlorosilyl group is covalently bonded to the substrate surface via Si atoms.

As explained above, it is important to maintain the active condition of the chemically adsorptive compound comprising at least one chlorosilyl group in the finishing agent. If the chemically adsorptive compound maintains its active condition, a condensation reaction is promoted between the compound and active hydrogens on a substrate surface. In other words, the compound is not hydrolyzed when the compound maintains its active condition.

When a fluorocarbon group is contained in a molecule comprising at least one chlorosilyl group, a strong, water- and oil repelling fluorocarbon polymer overcoat can be formed on a substrate surface. It is preferable to use $CF_3(CF_2)_n(R)_mSiX_pCl_{3-p}$ (wherein n represents 0 or an integer, R represents an alkyl group, a vinyl group, an ethynyl group, an aryl group or a substituent comprising a silicon atom or an oxygen atom; m represents 0 or 1; and X represents H, an alkyl group, an alkoxyl group or a substituent comprising a fluoroalkyl group or a fluoroalkoxy group; and p represents 0, 1 or 2) as the molecule comprising at least one chlorosilyl group.

A substrate used in the invention which utilizes active hydrogens, may comprise, for example, metals, ceramics, glass, plastic, paper, fiber, leather or the like. In case of plastic or fiber with no active hydrogens, the substrate surface can be made hydrophilic by treatment in a plasma or corona atmosphere containing oxygen.

Moreover, in order to prepare an organosiloxane-based finishing agent which can form an overcoat with a high water-separation property, a composition containing a chemical adsorbent, comprising at least one organosiloxane bond chain and chlorosilyl group, and a nonaqueous viscous liquid or a solid medium is prepared.

If a material comprising at least one fluorocarbon chain and chlorosilyl group is also added to the organosiloxane-based finishing agent, the agent can form an overcoat not only with a water-separation property but with an oil-repelling property.

A method of manufacturing the organosiloxane-based finishing agent comprises the steps of:
  dehydrating a chemical adsorbent to around 10 ppm of water or less;
  mixing the chemical adsorbent in an inactive nonaqueous viscous liquid or solid medium, thus preparing a mixture; and
  adding a chemical adsorbent comprising at least one organosiloxane bond chain and chlorosilyl group into the mixture.

When the nonaqueous viscous liquid or solid medium is inactive, a condensation reaction is not promoted between the viscous liquid or solid medium and the chemical adsorbent.

The chemical adsorbent comprising at least one organosiloxane bond chain and chlorosilyl group can be represented as $R(SiR_2O)_nSiCl_3$ (wherein R represents an alkyl group and n represents an integer). $Cl(SiR_2O)_n\text{-}SiR_2Cl$ or $Cl_3SiO(SiR_2O)_nSiCl_3$ (wherein R represents an alkyl group and n represents an integer).

When the material comprising at least one fluorocarbon chain and chlorosilyl group, $CF_3(CF_2)_u(R)_mSiX_pCl_{3-p}$ (wherein m and n represent 0 or an integer; R represents an alkyl group, a vinyl group, an ethynyl group, an aryl group or a substituent comprising a silicon atom or an oxygen atom: X represents H, an alkyl group, an alkoxyl group or a substituent comprising a fluoroalkyl group or a fluoroalkoxy group; and p represents 0, 1 or 2), is added to the organosiloxane-based finishing agent, an overcoat with high water-separation and oil-repelling properties can be formed.

If a tertiary amine or amide with no active hydrogens is also mixed in the chemical adsorbent during the step of mixing the adsorbent in the nonaqueous viscous liquid or solid medium, an organosiloxane-based finishing agent with high stability is prepared.

A method of using the organosiloxane-based finishing agent comprises the steps of:
  washing and drying a substrate surface;
  applying a composition containing a chemical adsorbent, comprising at least one organosiloxane bond chain and chlorosilyl group, and a nonaqueous viscous liquid or a solid medium, to the substrate surface;
  reacting and drying the composition; and
  wiping off the composition on the substrate surface.

The step of applying the composition and the step of reacting and drying the composition are required in this method. It is more efficient to heat the composition to about 50° C. during the reacting and drying step. As a result, an overcoat with a high water-separation property can be formed on the substrate surface.

Conveniently, the organosiloxane-based finishing agent is inhibited from running during application to a substrate surface when the viscosity of the viscous liquid or solid medium is 1000 cps or above. If the viscous liquid or solid medium with its boiling point at 200° C. or above is mixed with one having a boiling point from 100° C. to 150° C., an overcoat can firm up quickly right after the application of the agent by vaporizing the material with the low boiling point. As a result, the removal of the finishing agent simplified.

Moreover, if an abrasive material made of particles less than 10 microns (such as alumina, silicon carbide, boron carbide, chromium oxide, iron oxide, synthetic diamond or fine-grain silica) is added to the organosiloxane-based finishing agent, a small amount of the substrate surface is removed without reducing the luster of the surface. As a result, the reaction between chemical admolecules containing at least one chlorosilyl group and the cleaned substrate surface is improved. The content of this abrasive material in the finishing agent is preferably 1-10% by weight.

Examples of a substrate used for the invention include ones having hydroxyl groups (—OH) on their surfaces—metals such as Al, Cu, stainless steel or the like, glass, ceramics, paper, fiber, leather or other hydrophilic groups. When a material which does not have a hydroxyl group on its surface such as plastic is used, hyroxyl groups can be introduced to the surface by a corona treatment of 100W for 20 minutes in a plasma atmosphere containing oxygen, thus making the surface hydrophilic. However, if a polyamide and polyurethane resin having imino groups (>NH) on their surfaces is used, such treatment is not necessary; a dehydrochlorination reaction is promoted between the hydrogens of the imino groups (>NH) of the substrate and the chlorosilyl groups (—SiCl) of the chemical admolecule, thereby forming silicon-nitrogen bonds (—SiN—). In the method of forming an overcoat with a high water-separation property from the organosiloxane-based finishing agent, an adhesive, thin overcoat can be formed on a substrate surface. Since the overcoat can be applied any parts where water drops may stick, such as the sidings and windows of vehicles, the walls and windows of buildings, walls, or the like, the overcoat can be significantly useful.

The content of the chemical adsorbent comprising at least one organosiloxane bond chain and chlorosilyl group in the finishing agent is preferably 1-30% by weight.

Moreover, any nonaqueous organic material which is inactive to the chemical adsorbent comprising an organosiloxane bond chain and chlorosilyl group can be used as the nonaqueous viscous liquid or solid medium. Petroleum-based solvents, silicone, paraffin based wax or the like are especially cheap and useful. More specifically, examples of the organic solvent include petroleum naphtha, solvent naphtha, petroleum ether, petroleum benzene, isoparaffin, N-paraffin, decalin, industrial gasoline, kerosene, ligroin, dimethylsilicone, phenylsilicone, alkyl modified silicone, polyether silicone, paraffin wax, microcrystal wax, polyethylene wax, ester wax, wax, oxide, and petroleum wax. The above-noted examples, alone or in combination can be applied as the viscous liquid or solid medium in the invention. The content of the viscous liquid or medium in the finishing agent is preferably 50-90% by weight.

When the organosiloxane based finishing agent of the invention is used to treat a substrate surface, a thin, oil-repellent and durable overcoat with a high water-separation property is easily formed on the surface. The procedure for coating the agent on the substrate surface are simple, and does not require a large-scale reactor.

Since the nonaqueous viscous liquid or solid medium is dehydrated to 10 ppm of water or less, the chemical adsorbent with at least one organosiloxane bond chain and chlorosilyl group which is instable to water can be contained in the organosiloxane-based finishing agent in an active condition.

In a method of using the organosiloxane-based finishing agent of the invention, the agent, comprising a chemical adsorbent with at least one organosiloxane bond chain and chlorosilyl group and a nonaqueous viscous liquid or solid medium, is applied to a substrate surface comprising hydrophilic groups. Thus, the chemical adsorbent reacts with the substrate surface at room temperature (or a temperature lower than 100° C.), and then the agent is dried. When the substrate surface comprises active hydrogens, a dehydrochlorination reaction between the active hydrogens and the chlorosilyl groups is generated. As a result, the chemical adsorbent comprising at least one organosiloxane bond chain and chlorosilyl group is covalently bonded to the substrate surface via Si atoms. Unreacted finishing agent is then either wiped off or washed away with detergent or water.

Although the chemical adsorbent is very reactive to moisture in the air, the nonaqueous viscous liquid or solid medium can protect the substrate surface from moisture, thereby helping to promote the dehydrochlorination reaction on the surface. If the finishing agent contains a solvent having a boiling point of around 200° C.±50° C., the solvent can be evaporated at a preferable level, thus promoting the reaction between water and the chlorosilyl groups and generating HCl smoothly. As a result, the chemical adsorbent comprising at least one organosiloxane bond chain and chlorosilyl group is covalently bonded to a substrate surface via Si atoms, thus forming a ultra thin organosiloxane-based overcoat with a high water-separation property on the surface.

DETAILED DESCRIPTION OF THE INVENTION

Figure 1:
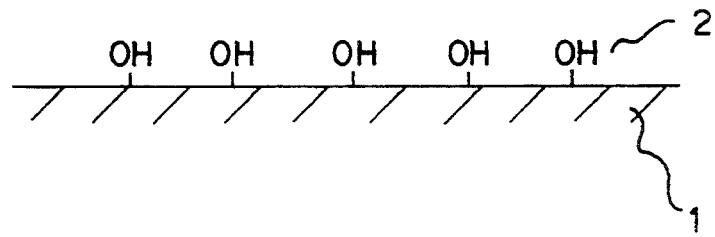
FIG. 1 is a cross-sectional view of a substrate surface, enlarged to a molecular level, explaining the procedures of a surface finishing treatment of an example according to the invention.

A finishing agent of the invention is mainly comprised of a siloxane compound, a chemically adsorptive compound with at least one halosilyl group, tertiary amine or amide containing no active hydrogens, and a nonaqueous viscous liquid or solid medium.

Suitable chemical admolecules, containing at least one halosilyl group, include a hydrocarbon-based molecule such as those shown below:

$CH_3(CH_2)_rSiX_pCl_{3-p}$;

$CH_3(CH_2)_sO(CH_2)_tSiX_pCl_{3-p}$;

$CH_3(CH_2)_uSi(CH_3)_2(CH_2)_vSiX_pCl_{3-p}$;

$CF_3COO(CH_2)_wSiX_pCl_{3-p}$;

$Cl_{3-p}SiX_p(R)_m(CF_2)_n(R)_mSiX_pCl_{3-p}$;

$CF_3(CF_2)_n(R)_mSiX_pCl_{3-p}$ wherein r is 1 to 25; s is 0 to 12; t is 1 to 20; u is 0 to 12; v is 1 to 20; w is 1 to 25; n is 0 or an integer; R represents an alkyl group, a vinyl group, an ethynyl group, an aryl group or a substituent comprising a silicon atom or an oxygen atom; m is 0 or 1; X represents H, an alkyl group, an alkoxyl group or a substituent comprising a fluoroalkyl group or a fluoroalkoxy group; and p is 0, 1 or 2.

In addition, specific examples of the chemically adsorptive compounds include the following:

$CH_3CH_2O(CH_2)_{15}SiCl_3$;

$CH_3(CH_2)_2Si(CH_3)_2(CH_2)_{15}SiCl_3$;

$CH_3(CH_2)_6Si(CH_3)_2(CH_2)_9SiCl_3$;

$CH_3COO(CH_2)_{15}SiCl_3$;

$CF_3(CF_2)_7(CH_2)_2SiCl_3$;

$Cl_3Si(CH_2)_2(CF_2)_6(CH_2)_2SiCl_3$;

$CF_3(CF_2)_5(CH_2)_2SiCl_3$;

$CF_3(CF_2)_7C_6H_6SiCl_3$.

Tertiary amines or amides with no active hydrogens include triethylamine, trimethylamine, pyridine, N-methylpyrrolidinon, N-methylpyrrole, N/N-dimethylaniline, triazine, dimethylbutylamine, dipyridine, indole, N/N-dimethylnaphthylamine or the like. The content of the amine or amide in the finishing agent is more than the amount of hydrochloric acid, made from the decomposition of the material containing many chlorosilysilyl groups and the molecules comprising at least one chlorosilyl group, in moles. More specifically, when a chemical admolecule comprises one chlorosilyl group, the content should be the same as that of the admolecule in moles. If the chemical admolecule comprises two chlorosilyl groups, the content of the amine or amide should be twice as much as that of the admolecule in moles. The content of the amine or amide in the agent should be also three times more than that of the admolecule comprising three chlorosilyl groups. However, it is believed that no problems would arise even if the amount of added amine or amide is excessive. It is preferable that the content of the chemical admolecules in the finishing agent of the invention is 1–30% by weight.

Moreover, any nonaqueous solvent having no active hydrogens can be used as the nonaqueous viscous liquid or solid medium. Petroleum-based solvents, silicone, paraffin-based wax or the like are especially cheap and useful.

Examples of such solvents include:
petroleum naphtha; solvent naphtha; petroleum ether; petroleum benzene; isoparaffin; N-paraffin; decalin; industrial gasoline; kerosene; ligroin; dimethylsilicone; phenylsilicone; alkyl modified silicone; polyether silicone; paraffin wax; microcrystal wax; polyethylene wax; ester wax; wax oxide; and petroleum wax.

The above-noted examples, alone or in combination can be applied as the viscous liquid or solid medium in the invention. The content of the liquid or medium in the finishing agent is preferably 50 to 90% by weight.

When the viscosity of the liquid or medium is 1000 cps or above, the finishing agent does not run, which facilitates handling of the agent. However, it is difficult to handle the agent if the liquid or medium is too firm. The removal of unreacted agent is simple if the viscous liquid or solid medium with its boiling point at 100° C. or above is mixed with the one having a boiling point from room temperature to 110° C.

Moreover, if an abrasive material around several microns in diameter (such as alumina, silicon carbide, boron carbide, chromium oxide, iron oxide, synthetic diamond or fine-grain silica), is added to the finishing agent, a small amount of substrate surface would be removed during the application of the agent. As a result, the reaction of the chemical admolecules to the substrate is generated easily. The content of the abrasive material in the agent is preferably 1 to 10% by weight.

A method of manufacturing the finishing agent of the invention comprises the steps of:
preparing a nonaqueous viscous liquid or a solid medium:
mixing a tertiary amine or amide with no active hydrogens in the liquid or medium;
mixing a silyl compound comprising at least two halogen groups, thus promoting the reaction between water contained in the liquid or medium and the silyl compound so as to form a polysiloxane compound; and
adding and mixing a chemically adsorptive compound comprising at least one chlorosilyl group with the polysiloxane compound.

It is preferable to use at least one compound selected from the group consisting of $SiCl_4$, $SiHCl_3$, $SiH_2Cl_2$, and $SiCl_3O(SiCl_2O)_nSiCl_3$ (wherein n represents 0 or an integer) as the silyl compound comprising many halogen groups.

Any chlorosilane-based surface active agents, in which straight chain siloxane bonds are contained and chlorosilane groups ($SiCl_nX_{3-n}$, wherein n represents 1, 2 or 3, and X represents a functional group) are bonded at one end of the siloxane bonds, can be used for forming an organosiloxane-based overcoat with a high water-separation property. However, it is most preferable to use a chemical adsorbent comprising at least one organosiloxane bond chain and chlorosilyl group, such as $R(SiR_2O)_mSiCl_nX_{3-n}$ (wherein m represents an integer, preferably 2-5, n represents 1, 2 or 3, X represents a functional group, and R represents an alkyl group). A functional group includes an alkyl group or the like.

It is possible to use any chlorosilane-based surface active agent, comprising straight chain siloxane bonds with chlorosilane groups ($SiCl_nX_{3-n}$ groups, wherein n represents 1, 2 or 3, and X represents a functional group) at both end of the siloxane bonds, for forming an organosiloxane-based overcoat with a high water-separation property. Particularly, it is most preferable to use $Cl(SiR_2O)_nSiR_2Cl$ or $Cl_3SiO(SiR_2O)_nSiCl_3$ (wherein R represents an alkyl group, and n represents an integer, preferably 2-5).

However, if the organosiloxane-based finishing agent contains not only the material comprising an organosiloxane bond chain and chlorosilyl group but a material comprising a siloxane bond chain and fluorocarbon group, an overcoat formed from the finishing agent has a high water-separation property as well as an oil-repellent property. The material comprising an organosiloxane bond chain and chlorosilyl group includes $R(SiR_2O)_nSiCl_3$ (wherein R represents an alkyl group and n represents an integer). $Cl(SiR_2O)_nSiR_2Cl$ and $Cl_3SiO(SiR_2O)_nSiCl_3$ (wherein R represents an alkyl group and n represents an integer). The material comprising a fluorocarbon chain and chlorosilyl group, in addition, including $CF_3(CF_2)_n(R)_mSiX_pCl_{3-p}$ (wherein m and n represents 0 or an integer, R represents an alkyl group, a vinyl group, an ethylnyl group, an aryl group or a substituent comprising a silicone or an oxygen atom, X represents H, an alkyl group, an alkoxyl group or a substituent comprising a fluoroalkyl group or a fluoroalkoxy group, and p represents 0, 1 or 2).

A method of using the organosiloxane-based finishing agent of the invention comprises the steps of:
washing a substrate surface having active hydrogens thoroughly;
drying the substrate surface;
applying the finishing agent on the substrate surface;
reacting chlorosilyl compound molecules (chemical admolecules) to the active hydrogens on the substrate surface (such as hydroxyl groups: —OH) at room temperature, thus causing a dehydrochlorination reaction between the chlorosilyl groups and the active hydrogens;
covalently bonding the admolecules to the substrate surface via Si atoms; and
wiping off or washing away the extra agent left on the substrate surface with detergent or water.

In the above procedure, the admolecules fixed on the substrate surface are likely to react to moisture in the air. A nonaqueous viscous liquid or solid medium, however, would protect the substrate from moisture, thereby helping to promote the dehydrochlorination reaction.

After the above-noted steps, chemical admolecules comprising at least one chlorosilyl group are fixed to the substrate surface by a covalent bonding via Si atoms, thereby forming an ultra thin overcoat at a thickness at the angstrom or nanometer level.

Examples of a substrate used for the invention include substrates having hydroxyl groups (—OH) on their surfaces—metals such Al, Cu, stainless steel or the like, glass, ceramics, paper, fiber, leather or other hydrophilic groups. When a material, such as plastic, does not have a hydroxyl group on its surface, the hydroxyl groups can be introduced to the surface by a corona treatment of 100 W for 20 minutes in a plasma atmosphere containing oxygen, thus making the surface hydrophilic. However, when using polyamide and polyurethane resin having imino groups (>NH) on their surfaces, such treatment is not necessary; a dehydrochlorination reaction is promoted between the hydrogens of the imino groups (>NH) of the substrate and the chlorosilyl groups (—SiCl) of the chemical ad-molecule, thereby forming silicon-nitrogen bonds (—SiN—). By fixing an ultra thin fluorocarbon-based polymer overcoat to a substrate surface, numerous applications present themselves, including electric goods such as a hot plate, rice steamer or the like, automobiles, industrial equipment, glass, mirrors, lenses for glasses, interior goods, apparel or the like. The quality of the substrate is also improved with regard to heat and weather resistance and abrasion properties.

This invention can be applicable for various uses and materials such as described below.

(a) substrates metal, ceramics, plastic, wood, stone (the invention being applicable even when the substrate surface is coated with paint or the like in advance):

(b) cutlery—kitchen and other knives, scissors, engraver, razor blade, hair clippers, saw, plane, chisel, gimlet, badkin, cutting tools, drill tip, blender blade, juicer blade, flour mill blade, lawn mower blade, punch, straw cutter, stapler, blade for can opener, surgical knife or the like;

(c) needles—acupuncture needle, sewing needle, sewing-machine needle, long thick needle for making tatami, syringe needle, surgical needle, safety pin or the like;

(d) products in the pottery industry—products made of pottery, glass, ceramics or enameled products, including hygienic potteries (such as chamber pot, wash-bowl, bathtub, etc.), tableware (such as a rice bowl, plate, bowl, teacup, glass, bottle, coffee-pot, pots and pans, earthenware mortar, cup, etc.), flower vases (such as a flower bowl, flowerpot, small flower vase, etc.), chemistry apparatus (such as a beaker, reacter vessel, test tube, flask, culture dish, condenser, stirring rod, stirrer, mortar, vat, syringe), roof tile, tile, enameled tableware, enameled wash bowl, and enameled pots and pans;

(e) mirrors—hand mirror, full-length mirror, bathroom mirror, washroom mirror, mirrors for automobile (back and side mirrors), half mirror, mirror for show window, mirrors for department store or the like;

(f) molding parts—die for press molding, die for cast molding, die for injection molding, die for transfer molding, die for vacuum molding, die for blow forming, die for extrusion molding, die for inflation molding, die for fiber spinning, calender processing roll;

(g) ornaments—watch, jewelry, pearl, sapphire, ruby, emerald, garnet, cat's-eye, diamond, topaz, bloodstone, aquamarine, turquoise, agate, marble, amethyst, cameo, opal, crystal, glass, ring, bracelet, brooch, tiepin, earrings, necklace, glasses frames (of patinum, gold, silver, aluminum, titanium, tin, compound metals of these elements, or stainless steel) or the like;

(h) molds for food—cake mold, cookie mold, bread mold, chocolate mold, jelly mold, ice cream mold, oven plate, ice tray or the like;

(i) cookware—pots and pans, iron pot, kettle, pot, frying pan, hot plate, net for grilling food, tool for draining off oil, plate for making takoyaki or the like;

(j) paper—photogravure paper, water and oil repellent paper, paper for poster, high-quality paper for pamphlets or the like;

(k) resin—polyolefin (such as polypropylene, polyethylene, etc.), polyvinylchloride, polyvinylidenechloride, polyamide, polyimide, polyamideimide, polyester, aromatic polyester, polystyrene, polysulfone, polyethersulfone, polyphenylenesulfide, phenolic resin, furan resin, urea resin, epoxide, polyurethane, silicon resin, ABS resin, methacrylic resin, ethylacrylate resin, ester resin, polyacetal, polyphenyleneoxide or the like;

(l) household electric goods—television, radio, tape recorder, audio goods, CD player, refrigerator, freezer, air conditioner, juicer, blender, blade of an electric fan, lighting equipment, dial plate, hair drier for perm or the like;

(m) sporting goods—skis, fishing rod, pole for pole vault, boat, sailboat, jet skis, surfboard, golf ball, bowling ball, fishing line, fishing net, fishing float or the like;

(n) vehicle parts;
  (1) ABS resin—lamp cover, instrument panel, trimming parts, and protector for a motorcycle,
  (2) cellulose plastic—markings for automobile, and steering wheel,
  (3) FRP (Fiber Reinforced Plastics)—bumper, and engine cover,
  (4) phenolic resin—brake,
  (5) polyacetal—wiper, wiper gear, gas valve, carburetor parts.
  (6) polyamide—radiator fan,
  (7) polyarylate (polycondensation polymerization by bisphenol A and pseudo phthalic acid)—direction indicator lamp (or lens), cowl board lens, relay case.
  (8) polybutylene terephthalate—rear end, front fender,
  (9) poly amino-bismaleimide—engine parts, gear box, wheel, suspension drive system.
  (10) methacrylate resin—lamp cover lens, meter panel and cover, and center mark,
  (11) polypropylene—bumper,
  (12) polyphenylene oxide—radiator grill, wheel cap,
  (13) polyurethane—bumper, fender, instrument panel, and fan,
  (14) unsaturated polyester resin—body, gas tank, heater housing, meter panel, (o) stationary goods—fountain pen, ballpoint pen, mechanical pencil, pencil case, binder, desk, chair, book shelf, rack, telephone base, ruler, draftsman's outfit or the like;

(p) building materials—roof materials (such as ceramic tile, slate, tin such as used in galvanized iron plate, etc.), outer wall materials (such as wood including processed wood, mortar, concrete, ceramic sizing, metallic sizing, brick, building stone, plastic material, metallic material including aluminum, etc.), interior materials (such as wood including processed wood, metallic material including aluminum, plastic material, paper, fiber, etc.) or the like;

(q) stone materials—granite, marble or the like, used for building, building material, works of art, ornament, bath, gravestone, monument, gatepost, stone wall, sidewalk, paving stone, etc.

(r) musical instruments and audio apparatus—percussion instruments, string instruments, keyboard instruments, woodwind instruments, brass instruments or the like, more specifically, drum, cymbals, violin, cello, guitar, koto, piano, flute, clarinet, shakuhachi, horn, etc., and microphone, speaker, earphone or the like.

(s) others—high voltage insulator with good water, oil and contamination repelling properties, including thermos bottles, vacuum apparatus, insulator for transmitting electricity, spark plugs or the like.

The invention will be explained specifically with reference to the following illustrative embodiments.

EXAMPLE 1

Soft solid wax was prepared by the following procedures:

mixing an oil-based solvent, a silicone, a paraffin based wax, a silyl compound comprising many Cl groups and the abrasive material listed below in an Erlenmeyer flask;

| | |
|---|---|
| (as an oil-based solvent) | 30 g |
| n-octane (bp. 143° C.) | |
| (as a silicone) | 20 g |
| silicone oil (Shinetsu Kagaku Kogyu KF-90, 1000 cps) | |
| (as a paraffin based wax) | 20 g |
| paraffin (made by Kanto mp 84–85° C.) | |
| (as a silyl compound comprising many chlor groups) | 4 g |
| SiCl$_3$OSiCl$_3$ | |
| (as an abrasive material) | 5 g |
| alpha-alumina (1 μm in average diameter) | | stirring the mixed material at 90° C., thus providing a suspension;

mixing 6 g heptadecafluorodecyl trichlorosilane (CF$_3$(CF$_2$)$_7$(CH$_2$)$_2$SiCl$_3$) into the Erlenmeyer flask, as molecules comprising at least one chlorosilyl group; and cooling the suspension to room temperature.

The wax obtained from the above-noted procedures is used as a finishing agent for the following treatments in order to evaluate the water and oil-repelling property and also endurance.

Figure 2:
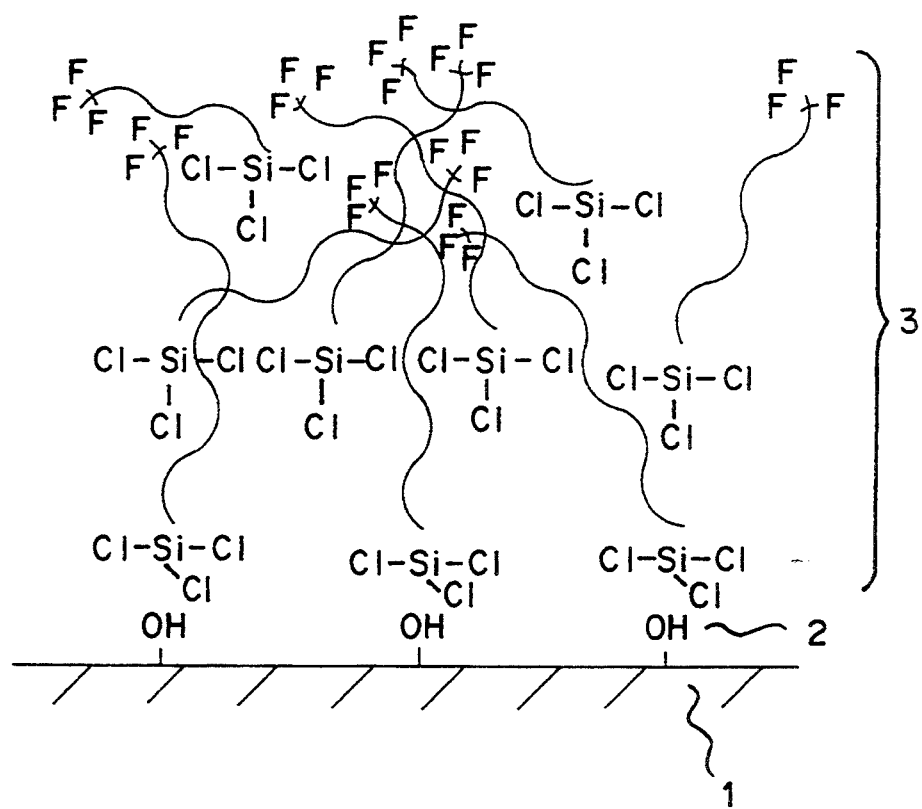
FIG. 2 is a cross-sectional view of a substrate surface of the example, enlarged to a molecular level, coated with a finishing agent of the example.
Figure 3:
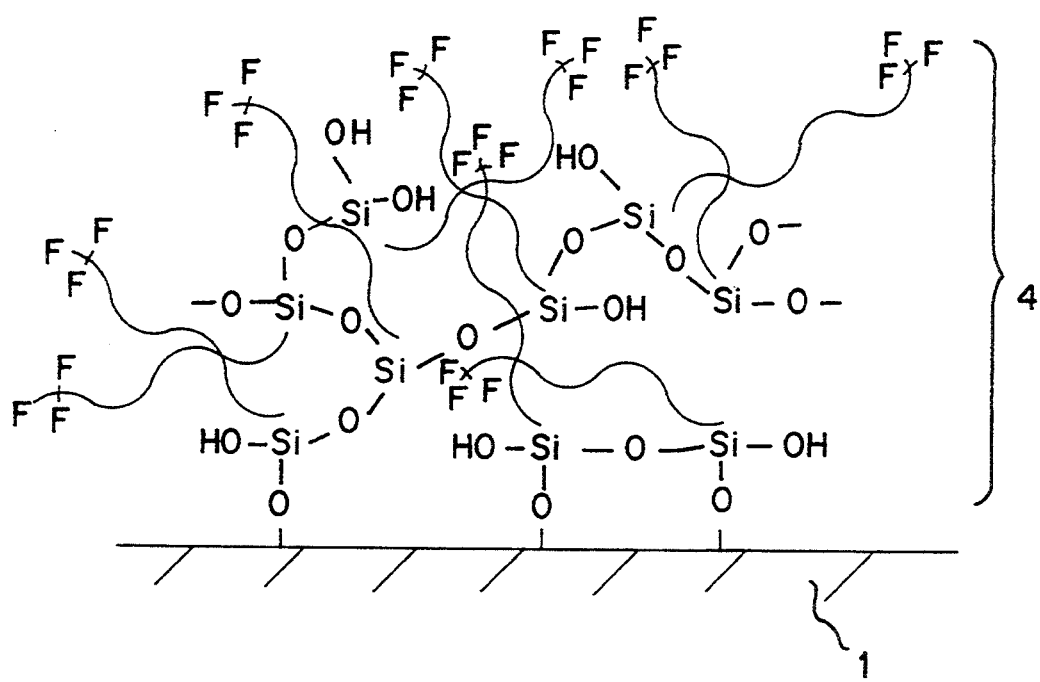
FIG. 3 is a cross-sectional view of a substrate surface of the example, enlarged to a molecular level, to which a finishing agent of the invention is chemically adsorbed.

An ultra thin fluorocarbon polymer overcoat was formed by the following procedures:

preparing an automobile window glass 1 (see FIG. 1) with its surface comprising numerous active hydrogens (OH groups 2) as a substrate;

applying the prepared finishing agent to the substrate surface with a sponge;

letting the substrate sit for 20 to 30 minutes, thus vaporizing n-decane and forming a white overcoat:

contacting heptadecaflourodecyl trichlorosilane to OH groups 2 to the substrate surface at a certain probability, thereby reacting and covalently bonding heptadecafluorodecyl trichlorosilane molecules 3 to the substrate surface via SiO bonding by a dehydrochlorination reaction between the chlorosilyl groups of the molecules and the active hydrogens of OH groups 2 (FIG. 2).

wiping off the extra agent with a dustcloth, thereby forming an ultra thin fluorocarbon overcoat 4 with a thickness of dozens of angstroms on the substrate surface by covalently bonding numerous heptadecafluorodecyl trichlorosilane molecules shown in FIG. 3 to the surface via a network bonding of SiO.

After the above noted procedures, furthermore, the heptadecafluorodecyl trichlorosilane molecule can react with moisture in the air; however, a nonaqueous viscous liquid or solid medium, such as silicon oil and paraffin, can prevent the moisture from disturbing the hydrochlorination reaction on the substrate surface.

The overcoat was not peeled off by a cross cut adhesion test. The contact angle of water was 116°. Oil applied on the substrate surface was easily wiped off with tissue paper.

EXAMPLE 2

A finishing agent, a mixture of the materials shown below, was prepared and evaluated as in Example 1.

| | |
|---|---|
| n-octone (bp. 126° C.) | 20 g |
| n-decone (bp. 143° C.) | 30 g |
| silicone oil (Shinetsti Kagaku Kogyo, KF-96 1000 cps) | 20 g |
| paraffin (made by Kanto Kagaku mp. 54–56° C.) | 20 g |
| SiCl$_3$OSiCl$_2$OSiCl$_3$ | 4 g |
| n-methylpyrrolidine | 3 g |
| alpha-alumina (1 micron) | 5 g |

After mixing these materials in an Erlenmeyer flask 7 g heptadecafluorodecyl trichlorosilane (CF$_3$(CF$_2$)$_7$(CH$_2$)$_2$SiCl$_3$) was then mixed into the flask, thus providing a suspension. The suspension was then cooled to room temperature, thus forming a soft solid wax.

Hydrochloric acid was hardly generated when the finishing agent of this example was applied on a substrate. The same results as in Example 1 were obtained in this example except that a white overcoat was formed after applying the agent to the substrate surface and letting the substrate sit for 10 to 15 minutes. The results are shown in Table 1.

EXAMPLE 3

The same experiment as in Example 2 was conducted in this example except that heptadecafluorodecyl trichlorosilane used in Example 2 was replaced with tridecafluorooctyl trichlorosilyl (CF$_3$(CF$_2$)$_5$(CH$_2$)$_2$SiCl$_3$). The results are shown in Table 1.

EXAMPLE 4

The same experiment as in Example 2 was conducted except that the glass used in Example 2 was replaced with a mirror. The results are shown in Table 1.

EXAMPLE 5

The same experiment as in Example 2 was conducted except that the glass used in Example 2 was replaced with a door of a painted automobile. The results are shown in Table 1.

EXAMPLE 6

The same experiment as in Example 2 was conducted except that the glass used in Example 2 was replaced with a hood of an automobile. The results are shown in Table 1.

EXAMPLE 7

The same experiment as in Example 2 was conducted except that the alpha alumina used in Example 2 was replaced with silica (1 μm in average diameter). The results are shown in Table 1.

EXAMPLE 8

The same experiment as in Example 1 was conducted except that the amount of n-decane was changed to 40 g. The viscosity of the prepared liquid was was about 3000 to 4000 cps. The results are shown in Table 1.

Reference 1

The same experiment as in Example 1 was conducted except that SiCl$_3$OSiCl$_3$ was not added to the mixed materials. The results are shown in Table 1.

Reference 2

The same experiment as in Example 2 was conducted except that SiCl$_3$OSiCl$_2$OSiCl$_3$ was not added to the mixed materials. The results are shown in Table 1.

TABLE 1

|  | Contact Angle of Water (°) | | Contact Angle of Oil (°) | |
| --- | --- | --- | --- | --- |
|  | Initial Number | After Rubbing Test | Initial Number | After Rubbing Test |
| Example 1 | 116 | 115 | 97 | 94 |
| Example 2 | 115 | 114 | 95 | 91 |
| Example 3 | 113 | 111 | 93 | 92 |
| Example 4 | 113 | 112 | 94 | 91 |
| Example 5 | 110 | 110 | 94 | 93 |
| Example 6 | 111 | 113 | 94 | 92 |
| Example 7 | 117 | 108 | 93 | 89 |
| Example 8 | 115 | 111 | 93 | 91 |
| Reference 1 | 98 | 95 | 75 | 73 |
| Reference 2 | 93 | 98 | 73 | 69 |

As clearly seen from Table 1, the substrate treated with a finishing agent of Examples 1–8 maintained its water- and oil-repelling or hydrophilic properties even after the surface was rubbed repeatedly with a wet cloth. In References 1 and 2, however, water- and oil-repelling properties were low even though the same amount of molecules comprising at least one chlorosilyl group was added to the mixed materials as the amount added for Examples 1–8.

The method of the invention can efficiently form an overcoat on the surface of plastic, ceramics, glass, or other materials by forming and fixing a polymer overcoat to the surface comprising active hydrogens.

In the manufacturing method of the invention, the tertiary amine or amide with no active hydrogens is mixed in a prepared nonaqueous viscous liquid or solid medium, and a dehydrochlorination reaction between water contained in the viscous liquid or solid medium and thiol- or amino-based impurities is promoted by mixing a silyl compound comprising numerous chloro groups into the liquid or medium. As a result, a polysiloxane compound is generated, and water and the thiol- or amino-impurities are stabilized as siloxane and hydrochloric acid. Therefore, a chemically adsorptive compound comprising at least one chlorosilyl group which is then added into the mixed materials would not be deactivated, thus manufacturing an active finishing agent.

If a compound comprising a fluorocarbon and chlorosilyl group is used as a material for forming an overcoat, a highly dense, ultra thin, water- and oil-repelling, anti-contaminating and durable overcoat with a uniform thickness can be formed on a substrate including metals, such as Al, Cu, stainless steel or the like by chemical bonding.

The method of manufacturing a finishing agent of the invention is effective in that heat, weather and abrasion resistant ultra thin overcoat can be applied for coating electric goods such as a hot plate and rice steamer, plus automobiles, industrial equipment, glass, mirror, lenses for glasses or the like.

EXAMPLE 9

Soft solid organosiloxane-based wax was prepared by the following procedures:

mixing an oil-based solvent, a silicone, a paraffin-based wax and an abrasive material mentioned below in an Erlenmeyer flask:

| | |
| --- | --- |
| (as an oil-based solvent) n-paraffin (bp. 180–210° C.) | 30 g |
| (as a silicone) silicone oil (Shinetsu Kagaku Kogyo KF-96, 1000 cps) | 18 g |
| (as a paraffin-based wax) paraffin (made by Wakou Junyaku, mp 95° C.) | 20 g |
| (as an abrasive material) alpha-alumina (1 micron) | 5 g | stirring the mixed material at 100° C., thus providing a white suspension:

mixing 6 g chemical adsorbent comprising at least one organosiloxane bond chain and chlorosilyl group, (CH$_3$)$_3$SiO(Si(CH$_3$)$_2$O)$_3$SiCl$_3$, in the Erlenmeyer flask; and cooling the suspension to room temperature.

Figure 4A:
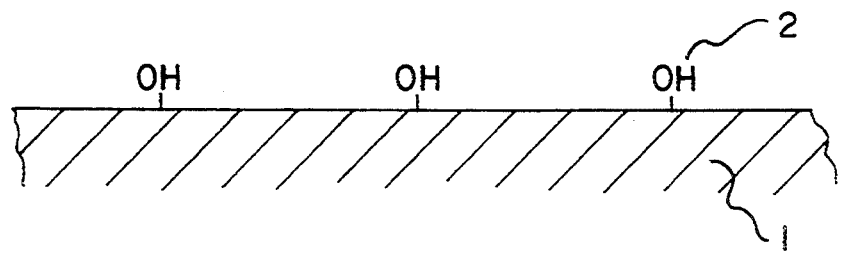
FIG. 4 is a cross-sectional view of a substrate surface, enlarged to a molecular level, explaining the procedures of a surface finishing treatment of another example of the invention.
Figure 4B:
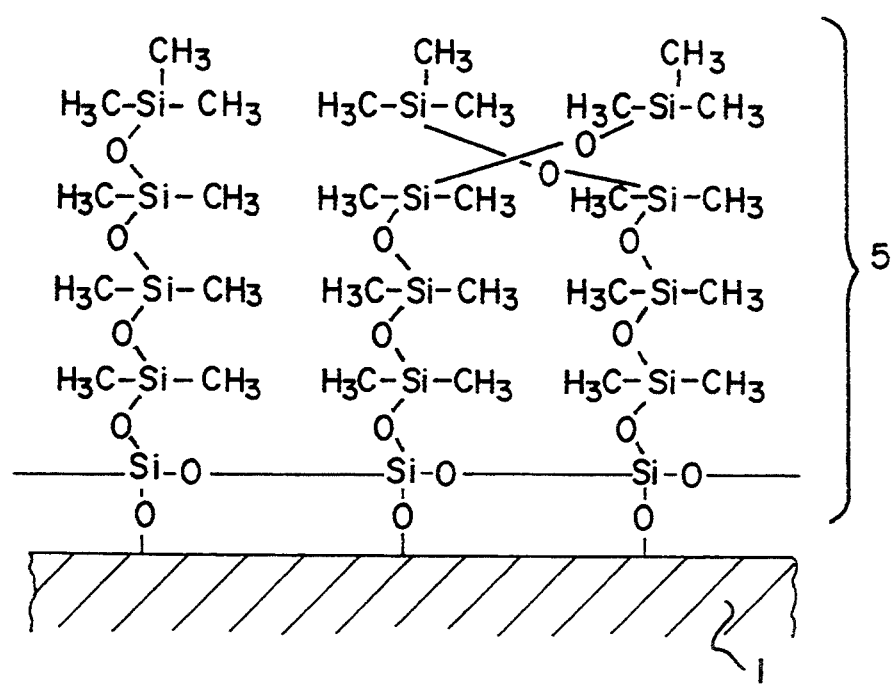

A white overcoat was formed by the following procedures:

preparing an automobile window glass 1 (see FIG. 4 (a)) with its surface comprising numerous active hydrogens (OH groups 2) as a substrate;

applying the prepared organosiloxane-based finishing agent to the substrate surface with a sponge; and letting the substrate siC for 20 to 30 minutes at room temperature, thus vaporizing n-paraffine and forming a white overcoat.

Covalent bonds shown in the following Formula 1 were formed on the entire surface of the substrate by a dehydrochlorination reaction between hydroxyl groups 2 of the substrate surface and the chlorosilyl (—SiCl) groups of the chemical adsorbent.

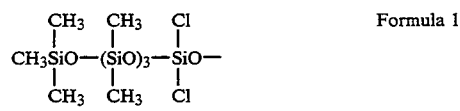

Formula 1

Then, extra finishing agent was wiped off with a dustcloth, and the chlorosilyl groups left on the substrate surface were reacted with moisture in the air. As a result, an organosiloxane-based overcoat 5 with a thickness of about 10 angstroms was formed on the substrate surface by convalently bonding numerous chemical admolecules as shown in the following Formula 2 to the surface via a network bonding of SiO (FIG. 5 (b)). The formation of the overcoat was confirmed by a Fourier transform infrared spectroscopy (FTIR).

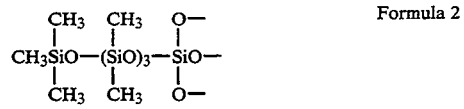

Formula 2

Even if silicon oil and paraffin were on the substrate surface and in the overcoat, a dehydrochlorination reaction between the chlorosilyl groups of the chemical adsorbent and the OH groups of the substrate surface was generated at a certain ratio. As a result, the chemical admolecules were covalently bonded to the substrate surface via SiO bonds.

The chemical adsorbent can react with moisture in the air: however, a nonaqueous viscous liquid or solid medium, such as silicon oil and paraffin, can prevent the moisture from disturbing the hydrochlorination reaction on the substrate surface.

The substrate formed with the overcoat of the example was washed thoroughly with detergent and water, and then water-repelling properties (contact angle of water) as well as water-separation properties (angle at which a drop of water slides down a substrate surface when the substrate is slowly tilted) were measured. The contact angle was 101° while the angle of a sliding 0.08 cc drop of water was 15°. The oil-repelling property, in addition, was measured by using hexadecane, and the contact angle of oil was 45°.

The film, in addition, was not peeled off by a cross-cut adhesion test.

EXAMPLE 10

Liquid wax was prepared by the following procedures:

mixing the following materials in an Erlenmeyer flask:

| | |
|---|---|
| n-octane (bp. 126° C.) | 20 g |
| n-paraffin (bp. 220-240° C.) | 30 g |
| silicone oil (Shinetsu Kagaku Kogyo KF-96, 1000 cps) | 20 g |
| paraffin (made by Wakou Junyaku, mp 95° C.) | 15 g |
| alpha-alumina (1 micron) | 5 g |
| n-methyl pyrrolidine | 3 g | mixing 7 g siloxane-based material comprising two chlorosilyl groups at the ends of molecules, Cl$_3$Si-O(Si(CH$_3$)$_2$O)$_3$SiCl$_3$, in the Erlenmeyer flask; and cooling the suspension to room temperature.

Figure 5A:
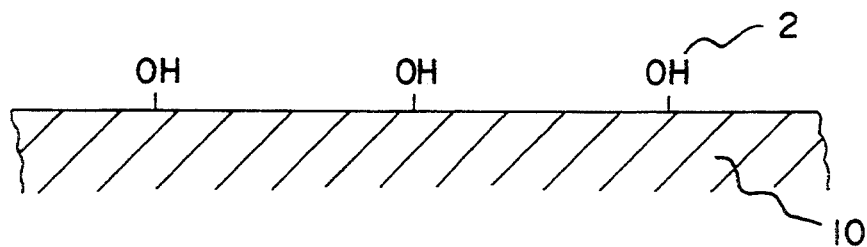
FIG. 5 is a cross-sectional view of a substrate surface, enlarged to a molecular level, explaining the procedures of a surface finishing treatment of another example of the invention.
Figure 5B:
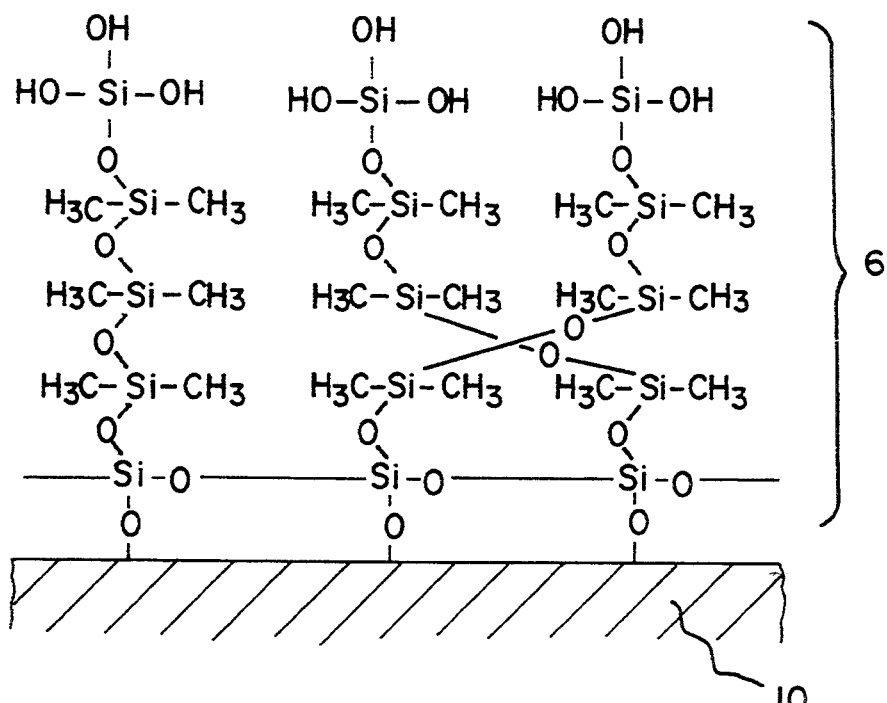

A white overcoat was formed by the following procedures:

preparing a rearview mirror 10 (see FIG. 5 (a)) of an automobile with its surface comprising numerous active hydrogens (OH groups 2) as a substrate;

rubbing the prepared finishing agent on the substrate surface with a sponge; and heating the substrate for 20 to 30 minutes at 50° C., thus vaporizing n-octane and n-paraffine and forming a white overcoat.

A dehydrochlorination reaction between the chlorosilyl (—SiCl) group at one end of a molecule and the hydroxyl groups of the substrate surface was generated, thus forming an overcoat shown in the following Formula 3 on the entire surface of the substrate.

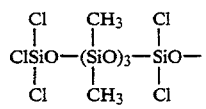

Formula 3

Then, extra finishing agent on the substrate surface was washed away with an organic solvent and then with water. The overcoat shown in Formula 3 was reacted with moisture in the air, thus forming an organosiloxane-based overcoat 6 shown in the following Formula 4 on the substrate surface (FIG. 5 (b)).

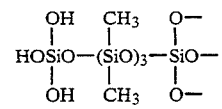

Formula 4

Organosiloxane-based overcoat 6 with a thickness of about 10 angstroms was hydrophilic and formed on the substrate surface via a chemical bonding.

The contact angle of water was 88° while the angle of a sliding 0.08 cc drop of water was 10°. The oil-repelling property was also measured by using hexadecane, and the contact angle of oil was 58°.

EXAMPLE 11

The same experiment as in Example 9 was conducted, except that the chemical adsorbent used in Example 9 was replaced with a chemical adsorbent in which Cl(Si(CH$_3$)$_2$O)$_4$SiCl$_3$ and CF$_3$(CH$_2$)$_5$SiCl$_3$ were mixed at a mole ratio of 1:1.

Since two kinds of materials containing many chlorosilyl (—SiCl) groups at the ends of molecules were used as the chemical adsorbent of this example, an overcoat in which molecules shown in the following Formulas 5 and 6 were mixed was formed. The formation of the overcoat was confirmed by FTIR.

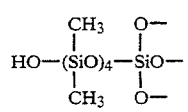

Formula 5

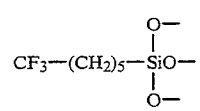

Formula 6

Figure 6:
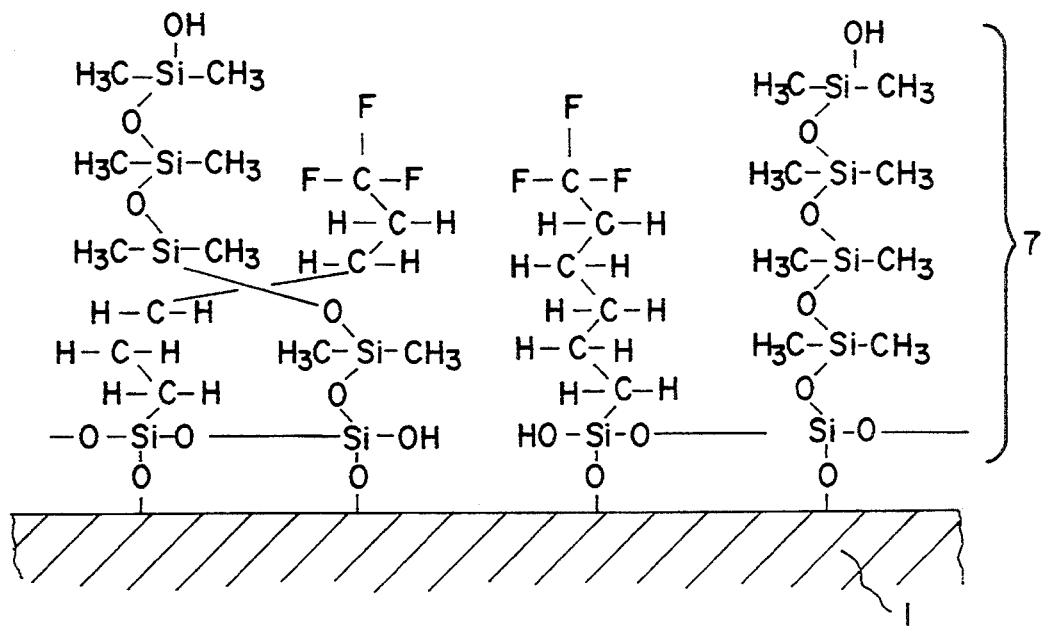
FIG. 6 is a cross-sectional view of a substrate surface of another example, enlarged to a molecular level, coated with a finishing agent of the invention.

In other words, due to a dehydrochlorination reaction between the hydroxyl groups on the substrate surface and the SiCl groups, an overcoat 7 in which a material containing fluorocarbon groups and a siloxane-based material were mixed was chemically bonded to the substrate surface (FIG. 6).

The contact angle of water on overcoat 7 was 103° while the angle of a sliding 0.08 cc drop of water was 8°. Oil-repelling property was also observed by using a hexadecane, and the contact angle of oil was 70°.

EXAMPLE 12

The same experiment as in Example 10 was directed, except that the chemical adsorbent was replaced with a chemical adsorbent, Cl(Si(CH$_3$)$_2$O)$_3$SiCl$_3$, mentioned in Example 10 and CF$_3$CF$_2$(CH$_2$)$_2$SiCl$_3$; they were mixed at a mole ratio of 4:1.

Since two kinds of materials containing many chlorosilyl (—SiCl) groups at the ends of molecules were mixed in the finishing agent, an overcoat in which molecules as shown in Formulas 7 and 8 were mixed was formed on the substrate surface. The formation of the overcoat was found by FTIR.

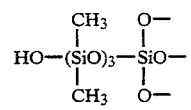

Formula 7

-continued $$\text{CF}_3-\text{CF}_2-(\text{CH}_2)_2-\underset{\underset{\text{O}-}{|}}{\overset{\overset{\text{O}-}{|}}{\text{SiO}}}-$$ Formula 8

Figure 7:
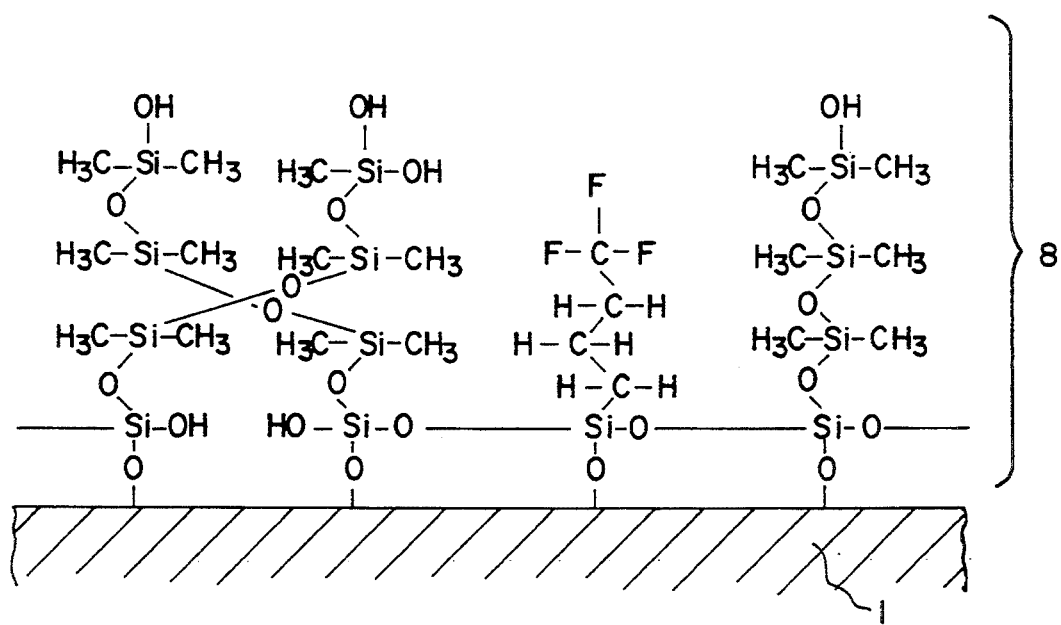
FIG. 7 is a cross-sectional view of a substrate surface of another example, enlarged to a molecular level, coated with a finishing agent of the invention.

More specifically, due to a dehydrochlorination reaction between the SiCl groups and the hydroxyl groups on the substrate surface, an overcoat 8 in which a material containing fluorocarbon groups and a siloxane-based material were mixed was chemically bonded to the substrate surface (FIG. 7).

The contact angle of water on overcoat 8 was 96° while the angle of a sliding 0.08 cc drop of water was 5°. The oil-repelling property of overcoat 8 was also observed by using hexadecane, and the contact angle of oil was 68°.

Reference 3

The same materials as in Example 9 were used except that $(\text{CH}_3)_3\text{SiO}(\text{Si}(\text{CH}_3)_2\text{O})_3\text{SiCl}_3$ used in Example 9 was replaced with $\text{CF}_3(\text{CF}_2)_7(\text{CH}_2)_2\text{SiCl}_3$. Then, the same experiment as in Example 9 was conducted except that the window glass substrate used in Example 9 was replaced with a slide glass. The contact angle of water as well as the angle of a sliding drop of water are shown in Table 2. The oil-repelling property of an overcoat formed from the finishing agent of this example was observed by using hexadecane, and the contact angle of oil was 75°.

Reference 4

The same materials as in Example 12 were used except that $\text{Cl}(\text{Si}(\text{CH}_3)_2\text{O})_3\text{SiCl}_3$ was not added to the materials in this reference. Then, the same experiment as in Example 12 was conducted except that mirror substrate used in Example 12 was replaced with a slide glass. The contact angle of water as well as the angle of a sliding drop of water are shown in the following table 2. The oil-repelling properties of an overcoat formed from the finishing agent of this example were observed by using hexadecane, and the contact angle of oil was 72°.

TABLE 2

| | Contact Angle of Water (°) | | Angle of Sliding* (°) | |
|---|---|---|---|---|
| | Initial Number | After Washing | Initial Number | After Washing |
| Example 9 | 106 | 105 | 13 | 12 |
| Example 10 | 83 | 85 | 10 | 7 |
| Example 11 | 96 | 98 | 7 | 8 |
| Example 12 | 96 | 96 | 8 | 6 |
| Reference 3 | 113 | 114 | 24 | 26 |
| Reference 4 | 108 | 107 | 21 | 22 |

*Angle of a Sliding Drop of Water (Showing A Water-separation Property)

As seen from Table 2, the substrate treated with the finishing agents of Examples 9–12 and References 3–4 maintained its water- and oil-repelling properties even after the surface was rubbed and washed with a cloth containing detergent. Finishing agents of Examples 9–12 comprising siloxane bond chains provided smaller contact angles of water compared with the finishing agents of References 3 and 4. However, these organosiloxane-based agents of Examples 9–12 can provide significantly small angles of a sliding drop of water while the agents of References 3 and 4 have large angles of sliding. Therefore, the organosiloxane-based finishing agents of the invention can provide a high water-separation property.

The chemical adsorbents comprising an organosiloxane bond chain and many chlorosilyl groups at the ends of molecules mentioned in the examples described above include the following:

$(\text{CH}_3)_3\text{SiO}(\text{Si}(\text{CH}_3)_2\text{O})_3\text{SiCl}_3$;

$\text{Cl}_3\text{SiO}(\text{Si}(\text{CH}_3)_2\text{O})_3\text{SiCl}_3$;

$\text{Cl}(\text{Si}(\text{CH}_3)_2\text{O})_4\text{SiCl}_3$;

$\text{CF}_3(\text{CH}_2)_3\text{SiCl}_3$;

$\text{Cl}(\text{Si}(\text{CH}_3)_2\text{O})_3\text{SiCl}_3$; and $\text{CF}_3\text{CF}_2(\text{CH}_2)_5\text{SiCl}_3$.

The following chemical adsorbents or a mixture of these adsorbents can also be used in the invention:

$(\text{CH}_3)_3\text{SiOSi}(\text{CH}_3)_2\text{OSiCl}_3$;

$(\text{CH}_3)_3\text{SiO}(\text{Si}(\text{CH}_3)_2\text{O})_2\text{SiCl}_3$;

$(\text{CH}_3)_3\text{SiO}(\text{Si}(\text{CH}_3)_2\text{O})_4\text{SiCl}_3$;

$(\text{CH}_3)_3\text{SiO}(\text{Si}(\text{CH}_3)_2\text{O})_5\text{SiCl}_3$;

$\text{Cl}_3\text{SiOSi}(\text{CH}_3)_2\text{OSiCl}_3$;

$\text{Cl}_3\text{SiO}(\text{Si}(\text{CH}_3)_2\text{O})_2\text{SiCl}_3$;

$\text{Cl}_3\text{SiO}(\text{Si}(\text{CH}_3)_2\text{O})_4\text{SiCl}_3$;

$\text{Cl}_3\text{SiO}(\text{Si}(\text{CH}_3)_2\text{O})_5\text{SiCl}_3$;

$\text{Cl}(\text{Si}(\text{CH}_3)_2\text{O})_2\text{SiCl}_3$;

$\text{Cl}(\text{Si}(\text{CH}_3)_2\text{O})_5\text{Si}(\text{Cl})_3$;

$\text{ClSi}(\text{CH}_3)_2\text{OSi}(\text{CH}_3)_2\text{Cl}$;

$\text{Cl}(\text{Si}(\text{CH}_3)_2\text{O})_2\text{Si}(\text{CH}_3)_2\text{Cl}$;

$\text{Cl}(\text{Si}(\text{CH}_3)_2\text{O})_3\text{Si}(\text{CH}_3)_2\text{Cl}$;

$\text{Cl}(\text{Si}(\text{CH}_3)_2\text{O})_4\text{Si}(\text{CH}_3)_2\text{Cl}$;

$\text{Cl}(\text{Si}(\text{CH}_3)_2\text{O})_5\text{Si}(\text{CH}_3)_2\text{Cl}$;

$\text{Cl}_3\text{Si}(\text{CH}_2)_2(\text{CF}_2)_6(\text{CH}_2)_2\text{SiCl}_3$;

$\text{CF}_3(\text{CH}_2)_2\text{SiCl}_3$;

$\text{CF}_3(\text{CH}_2)_3\text{SiCl}_3$;

$\text{CF}_3\text{CF}_2(\text{CH}_2)_2\text{SiCl}_3$;

$\text{CF}_3\text{CF}_2(\text{CH}_2)_3\text{SiCl}_3$;

$\text{CF}_3\text{CF}_2(\text{CH}_2)_5\text{SiCl}_3$;

$\text{CF}_3(\text{CF}_2)_2(\text{CH}_2)_2\text{SiCl}_3$;

$\text{CF}_3(\text{CF}_2)_3(\text{CH}_2)_2\text{SiCl}_3$;

$\text{CF}_3(\text{CF}_2)_3(\text{CH}_2)_8\text{SiCl}_3$;

$(\text{CH}_3)_3\text{Si}(\text{CH}_2)_{10}\text{SiCl}_3$;

$\text{CH}_3(\text{CH}_2)_{10}\text{SiCl}_3$;

Cl$_3$Si(CH$_2$)$_8$SiCl$_3$; and

Br(CH$_2$)$_{14}$SiCl$_3$.

Triethylamine, trimethylamine, pyridine, N-methylpyrrolidinon, N-methylpyrrole, N/N-dimethylaniline, triazine, dimethylbutylamine, dipyridine, indole, N/N-dimethylnaphthylamine or the like are suitable as the tertiary amine or amide with no active hydrogens. The content of the amine or amide in a finishing agent is greater than the amount of hydrochloric acid, made from the decomposition of the material containing many chlorosilysilyl groups and the molecules comprising at least one chlorosilyl group in moles. More specifically, with a chemical admolecule comprising one chlorosilyl group, the content should be the same as that of the admolecule in moles. If the chemical admolecule comprises two chlorosilyl groups, the content of the amine or amide should be twice as much as that of the admolecule in moles. The content of the amine or amide in the agent should be also three times greater than that of the admolecule comprising three chlorosilyl groups. However, it is believed that no problems will arise even if the amount of added amine or amide is excessive.

If a chemical adsorbent—in which a material comprising an organosiloxane bond chain and chlorosilyl group and a material comprising a fluorocarbon chain and chlorosilyl group are mixed—is used to form an overcoat, an overcoat with a high water-separation property and an oil-repellent property can be formed on various materials efficiently.

This overcoat having a high water-separation property is effective in that it can be applied to a substrate requiring an anti-heat, -weather and -abrasion ultra thin film with a high water-separation property such as electric goods, automobiles, industrial equipment, glasses, mirrors or the like.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

I claim:

1. A finishing agent comprising a siloxane compound, selected from the group consisting of Si(OH)$_4$, SiH(OH)$_3$, SiH$_2$(OH)$_2$, and Si(OH)$_3$O[Si(OH)$_2$O]$_n$ Si(OH)$_3$, wherein n represents 0 or an integer, a chemically adsorptive compound comprising at least one halosilyl group, and a nonaqueous viscous liquid or solid medium having a viscosity of 1000 cps or above.

2. A finishing agent according to claim 1, wherein the chemically adsorptive compound comprising at least one halosilyl group is represented by the formula ASiX$_p$Y$_{3-p}$, wherein A represents an organic group selected from the group consisting of an alkyl group, a vinyl group, an ethynyl group, an aryl group a silicon containing organic group and an oxygen containing organic group, X is a member selected from the group consisting of H, an alkyl group, an alkoxyl group, a fluoroalkyl group and a fluoroalkoxyl group, Y represents at least one halogen group selected from the group consisting of Cl, Br, F and I, and p represents 0, 1 or 2.

3. A finishing agent according to claim 1, wherein the nonaqueous viscous liquid or solid medium has a boiling point of 100° C. or above and is mixed with another nonaqueous viscous liquid or solid medium having a boiling point from 25° C. to 100° C.

4. A finishing agent according to claim 1, wherein further comprises inorganic particles smaller than 10 μm in average diameter.

* * * * *